United States Patent
Prados et al.

(10) Patent No.: US 8,040,323 B2
(45) Date of Patent: Oct. 18, 2011

(54) INPUT DEVICE

(75) Inventors: Michael Prados, Redwood City, CA (US); Philippe Alessandrini, Palo Alto, CA (US); Wolfgang Bloehs, Ingolstadt (DE)

(73) Assignee: Volkswagen AG, Wolfsburg (DE)

( * ) Notice: Subject to any disclaimer, the term of this patent is extended or adjusted under 35 U.S.C. 154(b) by 974 days.

(21) Appl. No.: 11/323,915

(22) Filed: Dec. 30, 2005

(65) Prior Publication Data

US 2006/0146039 A1   Jul. 6, 2006

Related U.S. Application Data (60) Provisional application No. 60/640,360, filed on Dec. 30, 2004.

(51) Int. Cl.
G06F 3/041 (2006.01)
(52) U.S. Cl. .................... 345/173; 715/700
(58) Field of Classification Search .......... 345/173–179; 178/18.01–18.11, 19.01–19.07; 700/715
See application file for complete search history.

(56) References Cited

U.S. PATENT DOCUMENTS

| | | | |
|---|---|---|---|
| 4,764,871 A | 8/1988 | van Zanten | 364/426 |
| 4,914,624 A | 4/1990 | Dunthorn et al. | |
| 5,943,043 A * | 8/1999 | Furuhata et al. | 345/173 |
| 6,118,435 A | 9/2000 | Fujita et al. | 345/173 |
| 6,411,877 B2 | 6/2002 | Böckmann et al. | 701/48 |
| 6,429,846 B2 | 8/2002 | Rosenberg et al. | 345/156 |
| 6,492,979 B1 | 12/2002 | Kent et al. | 345/173 |
| 6,496,200 B1 | 12/2002 | Snibbe et al. | 345/701 |
| 6,577,928 B2 * | 6/2003 | Obradovich | 701/1 |
| 6,636,202 B2 | 10/2003 | Ishmael, Jr. et al. | 345/173 |
| 6,822,635 B2 | 11/2004 | Shahoian et al. | 345/156 |
| 6,856,259 B1 * | 2/2005 | Sharp | 341/5 |
| 7,113,177 B2 | 9/2006 | Franzen | 345/173 |
| 7,158,123 B2 * | 1/2007 | Myers et al. | 345/173 |
| 7,292,228 B2 * | 11/2007 | Nagasaka et al. | 345/173 |
| 7,499,040 B2 | 3/2009 | Zadesky et al. | 345/204 |
| 2001/0043189 A1 | 11/2001 | Brisebois et al. | 345/156 |
| 2002/0033795 A1 | 3/2002 | Shahoian et al. | 345/156 |
| 2002/0149561 A1 | 10/2002 | Fukumoto et al. | 345/156 |
| 2002/0149571 A1 | 10/2002 | Roberts | 345/174 |
| 2002/0180710 A1 | 12/2002 | Roberts | 345/173 |
| 2003/0006892 A1 | 1/2003 | Church | 340/439 |
| 2003/0048251 A1 | 3/2003 | Liang et al. | 345/156 |
| 2003/0058265 A1 | 3/2003 | Robinson et al. | 345/701 |

(Continued)

FOREIGN PATENT DOCUMENTS

DE          19731285          1/1999

(Continued)

OTHER PUBLICATIONS www.3m.com ; 3M Touch Syatems; www.3m.com/3mtouch-systems/ ;p. 2.

(Continued)

Primary Examiner — Kevin M Nguyen
Assistant Examiner — Kenneth B Lee, Jr.
(74) Attorney, Agent, or Firm — King & Spalding L.L.P.

(57) ABSTRACT

An input device, especially an input device for a vehicle, includes a display for optical display of information, a touchscreen arranged above the display for input of commands by touching an operating surface of the touchscreen and a control for optical display of additional or other information on the display during at least a second simultaneously occurring touching of the operating surface.

21 Claims, 9 Drawing Sheets

U.S. PATENT DOCUMENTS

| | | | |
|---|---|---|---|
| 2003/0076306 A1 | 4/2003 | Zadesky et al. | 345/173 |
| 2003/0095112 A1 | 5/2003 | Kawano et al. | |
| 2003/0122779 A1 | 7/2003 | Martin et al. | 345/156 |
| 2003/0184526 A1 | 10/2003 | Nakajima et al. | 345/173 |
| 2004/0046751 A1 | 3/2004 | Heimermann et al. | 345/184 |
| 2004/0141007 A1 | 7/2004 | Amari et al. | 345/771 |
| 2004/0164971 A1 | 8/2004 | Hayward et al. | 345/179 |
| 2004/0188151 A1 | 9/2004 | Gerpheide et al. | 178/18.01 |
| 2005/0024344 A1 | 2/2005 | Trachte | 345/173 |
| 2006/0022955 A1* | 2/2006 | Kennedy | 345/173 |
| 2006/0028428 A1 | 2/2006 | Dai et al. | 345/156 |
| 2006/0097991 A1* | 5/2006 | Hotelling et al. | 345/173 |
| 2006/0209037 A1 | 9/2006 | Wang et al. | 345/173 |

FOREIGN PATENT DOCUMENTS

| | | |
|---|---|---|
| DE | 20180024 | 1/2001 |
| DE | 10139693 | 5/2002 |
| DE | 20102197 | 5/2002 |
| EP | 773496 A | 5/1997 |
| EP | 0836362 | 4/1998 |
| JP | 2001134382 A | 5/2001 |
| WO | 99/66763 | 12/1999 |
| WO | 00/21795 | 4/2000 |
| WO | 01/33103 | 5/2001 |
| WO | 01/54109 | 7/2001 |
| WO | 03/032141 | 4/2003 |
| WO | 03/038800 | 5/2003 |
| WO | 03/041046 | 5/2003 |

OTHER PUBLICATIONS www.3m.com ; MicroTouch M150 Touch Monitor ; www.3m.com/3mtouchsystem/products/Monitors/M150.jhtlm ; p. 3.

www.3m.com ; MicroTouch CRT Touch Monitor; www.3m.com/3mtouchsyatems/Products/Monitors/CRTdesktop.jhtlm ; p. 2.

www.3m.com ; MicroTouch Chassis Touch LCD Touch Monitors; www.3m.com/3mtouchsystems/Products/Monitors/FPDchassis.jhtlm ; p. 3.

www.elotouch.com ; Elo TouchSystem Products; www.elotouch.com/products/default.asp ; p. 2.

www.3m.com ; MicroTouch 5-Wire Resistive Touch Screen; www.3m.com/3mtouchsystems/Products/Resistive/5-wire.jhtml ; p. 2.

www.3m.com ; MicroTouch PL Analog Resistive Touch Screen; www.3m.com/3mtouchsystems/Products/Resistive/PL.jhtml ; p. 2.

www.3m.com ; MicroTouch FG Analog Resistive Touch Screens; www.3m.com/3mtouchsystems/Products/Resistive/FG.jhtml ; p. 2.

www.3m.com ; Specialty Resistive Touch Screens; www.3m.com/3mtouchsystems/Products/Resistive/SRTS.jhtml ; p. 2.

www.cybertouch.com ; DualForce Touch Screens; www.cybertouch.com/Dualforce.html ; p. 1.

S.A. Hall et al.; "Modeling of Surface Identifying Characteristics Using Fourier Series"; The Department of Cybernetics, University of Reading; www.isrg.reading.ac.uk/common/publications00226.pdf ; p. 7.

* cited by examiner

INPUT DEVICE

CROSS-REFERENCE TO RELATED APPLICATIONS

This application claims the benefit of U.S. Provisional Application No. 60/640,360 filed on Dec. 30, 2004, entitled "EINGABEVORRICHTUNG", which is incorporated herein by reference in its entirety.

TECHNICAL FIELD

The invention concerns an input device with a touchscreen, especially an input device for a vehicle.

BACKGROUND

A touchscreen is known, for example, from DE 201 02 197 U1 (incorporated by reference). A touchscreen for display of electronic signals and a confirming touch input of characters and symbols, consisting of a function level for display and key input and a higher, point-deformable protective level corresponding to it, are disclosed in DE 201 02 197 U1. During a selection of specific points of the function level by touching above the protective level, at least one confirmation signal for the touch direction (tactile stimulus) of the user is detectable at the position of the contact point in the deformed protective level is produced and the confirmation signal for the touch direction (tactile stimulus) is produced by vibration elements arranged eccentrically within or beneath the function level. In addition, in the touchscreen known from DE 201 02 197 U1, transmission of the generated vibrations from the function to the protection level occurs by direct contact of the two levels and/or via the edge regions of the levels through rigid or elastic connection elements.

Details concerning touchscreens can be taken, for example, from the Internet site www.3m.com/3mtouchsystems/. The following touchscreens of 3M™ are offered, for example:

MicroTouch™ 12.1" FPD touch monitor (vgl. www.3m.com/3mtouchsystems/Products/Monitors/FPDdesktop/jhtml)
MicroTouch™ M150 FPD touch monitor (vgl. www.3m.com/3mtouchsystems/Products/Monitors/M150/jhtml)
MicroTouch™ CRT touch monitor (vgl. www.3m.com/3mtouchsystems/Products/Monitors/CRTdesktop/jhtml)
MicroTouch™ ChassisTouch™ FPD touch monitor (vgl. www.3m.com/3mtouchsystems/Products/Monitors/FPDchassis/jhtml)
MicroTouch™ ChassisTouch™ CRT touch monitor (vgl. www.3m.com/3mtouchsystems/Products/Monitors/CRTchassis/jhtml)

Additional details concerning touchscreens can also be taken from the following internet sites:
www.elotouch.com/products/default.asp
www.3m.com/3mtouchsystems/Products/Resistive/5-wire.jhtml
www.3m.com/3mtouchsystems/Products/Resistive/PL-.jhtml
www.3m.com/3mtouchsystems/Products/Resistive/FG.jhtml
www.3m.com/3mtouchsystems/Products/Resistive/SRTS.jhtml A touch control with tactile feedback for input of signals to a computer and output of forces to a user of the touch control is also known from DE 201 80 024 U1 and the corresponding WO 01/54109 A1 (incorporated by reference), in which the touch control has a touch input device, which has an approximately flat contact surface, operated so that it enters a position signal through a processor of the computer based on a position on the contact surface that a user touches, in which case the position signal indicates the position in two dimensions. The touch control according to WO 01/54109 A1 also has at least one actuator connected to the touch input device, in which the actuator produces a force on the touch input device, in order to furnish the user touching the contact surface with a tactile sensation, in which the actuator delivers the force directly to the touch input device based on force information produced by the processor.

Tactile feedback is also known from U.S. Pat. No. 6,429,846, WO 03/038800 A1 (incorporated by reference) and WO 03/41046 A1 (incorporated by reference).

An operating element for a device with several selectable menus, functions and/or function values is known from DE 197 31 285 A1, which has a surface that can be grasped by the user, and via which the selection can be perceived through a local movement or touching of the surface. The surface is variable in its configuration according to the selected and/or selectable menu, function and/or function value.

SUMMARY

The task of the invention is to improve an input device with the touchscreen. It is desirable to create an input device particularly suitable for vehicles.

The aforementioned task is solved by an input device, especially an input device for a vehicle, with a display for optical display of information, a touchscreen arranged above the display for input of commands by touching an operating surface of the touchscreen and a control for optical display of additional or other information on the display during at least a second simultaneously occurring touching of the operating surface. Touching of the operating surface of the touchscreen according to the claims can then include light touching of the operating surface and/or pressing on the operating surface. A simultaneously occurring touching of the operating surface according to the invention is supposed to mean that there is at least one time or time interval, in which the first and the second touching of the operating surface occur simultaneously. A time interval, in which the first touching of the operating surface occurs, need not be identical to a time interval, in which the second touching of the operating surface occurs.

In one embodiment of the invention, said additional or other information can only be displayed on the display by means of the control, if the first touching of the operating surface begins before the second touching of the operating surface.

In one embodiment of the invention, said additional or other information can only be displayed on the display by means of the control, if the second touching of the operating surface ends before the first touching of the operating surface.

In another embodiment of the invention, said additional or other information can only be displayed by means of the control on the display, if the second simultaneously occurring touching of the operating surface lasts shorter than an upper time limit.

In another embodiment of the invention, the upper time limit is less than or equal to 1 s, especially less than or equal to 0.5 s.

In another embodiment of the invention, the input device also includes an actuator for movement of the touchscreen.

In another embodiment of the invention, the actuator can be controlled by a control, so that the touchscreen is moved to confirm a display of said additional or other information.

Additional advantages and details are apparent from the following description of practical examples.

DETAILED DESCRIPTION

Figure 1:
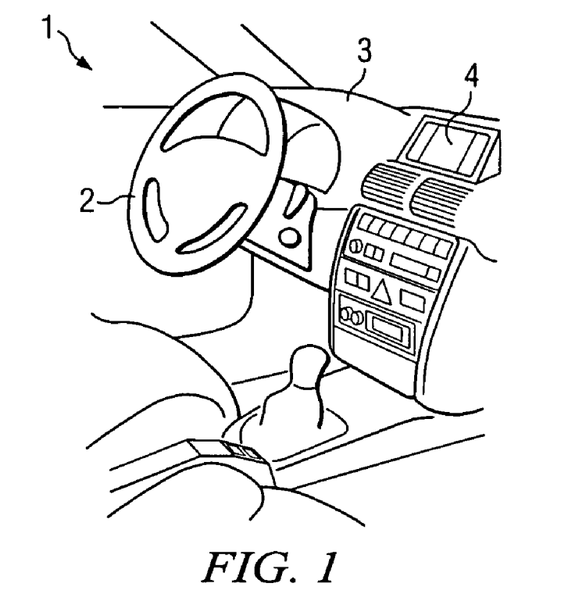
FIG. 1 shows a practical example for a cockpit of a vehicle.
Figure 2:
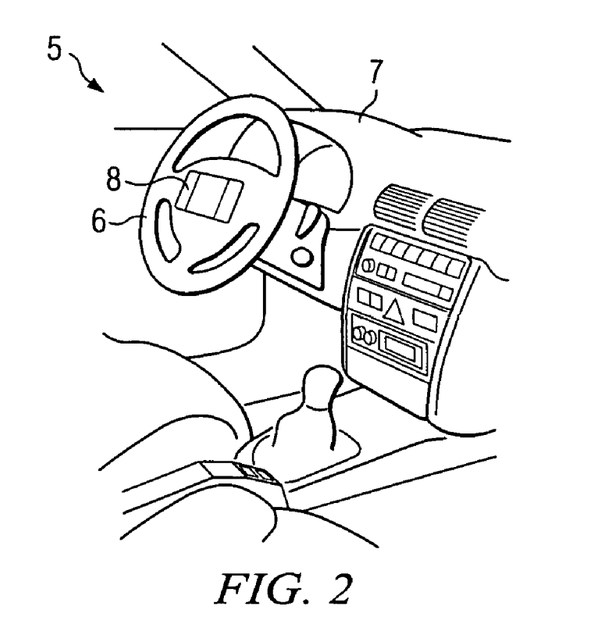
FIG. 2 shows another practical example for a cockpit of a vehicle.

FIG. 1 shows a practical example for a cockpit 1 of a vehicle. A steering wheel 2 is arranged in the cockpit 1 beneath a dashboard 3. The dashboard 3 has an input device 4 arranged next to steering wheel 2. FIG. 2 shows an alternative practical example for a cockpit 5 of a vehicle, in which a steering wheel 6 is also arranged in cockpit 5 beneath a dashboard 7. However, deviating from the practical example according to FIG. 1, an input device 8 is arranged in the steering wheel 6.

Figure 3:
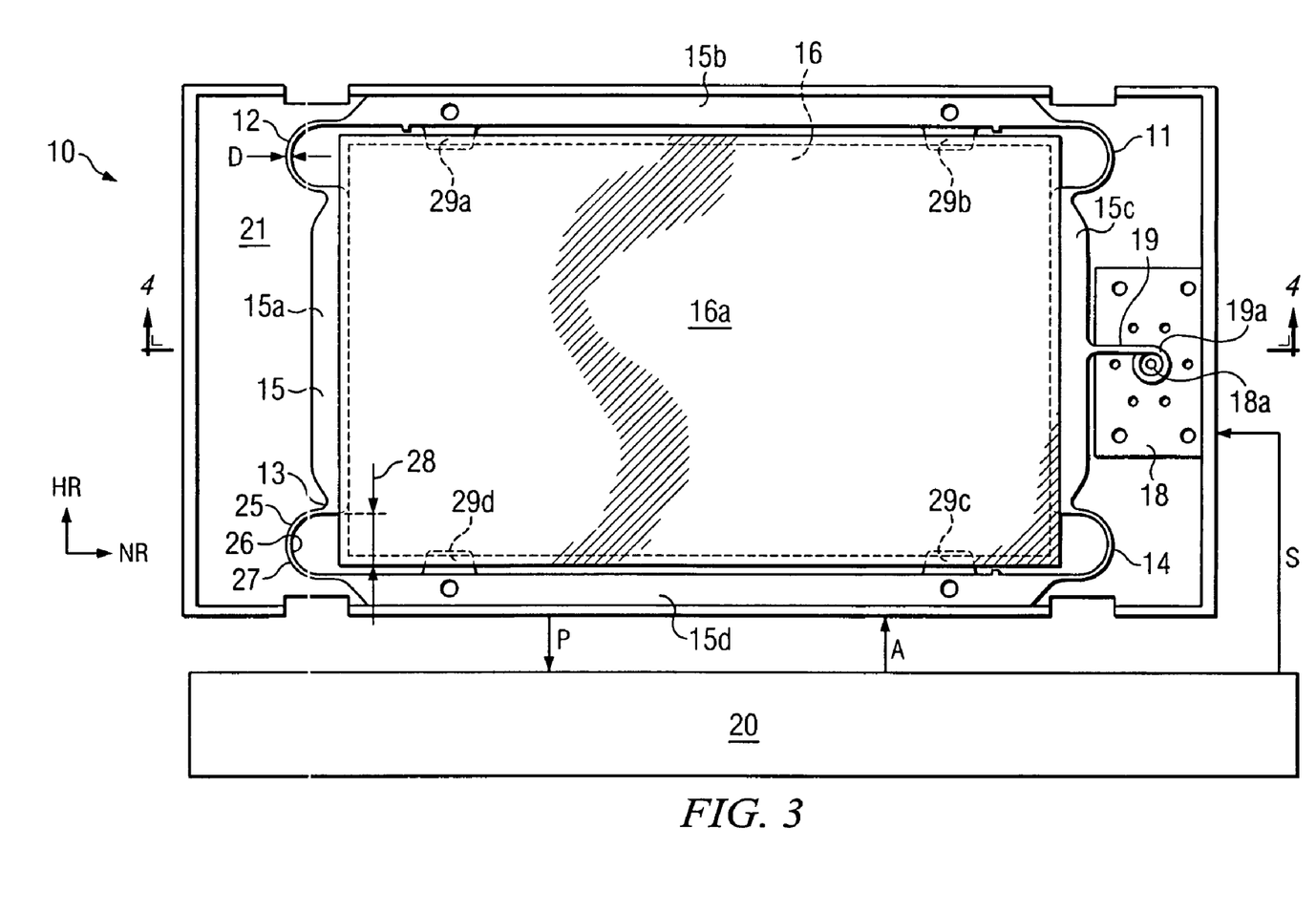
FIG. 3 shows an input device.
Figure 4:
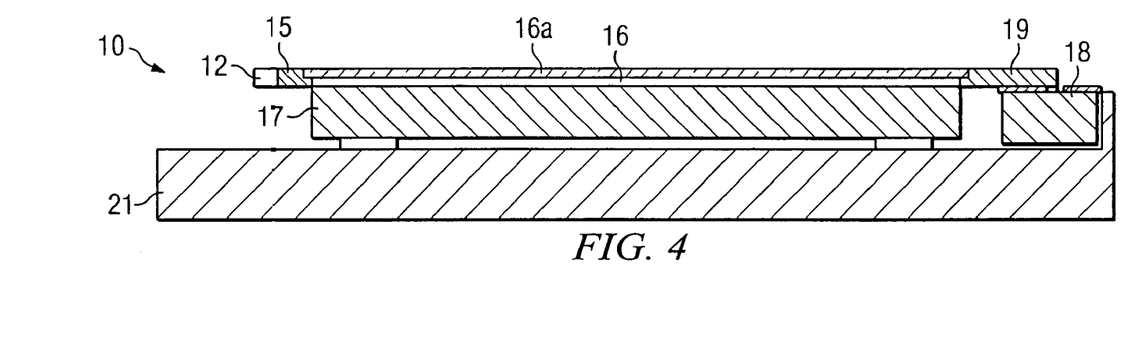
FIG. 4 shows a cross-section of the input device along section A-A according to FIG. 3.

FIG. 3 shows, as a possible practical example in the input device 4 or 8, an input device 10 for optical display of information and for input of commands in a top view. FIG. 4 shows a cross-section of the input device 10 along section A-A according to FIG. 3. The input device 10 has a transparent touchscreen 6 arranged above a display 17 with an operating surface 16A. The display 17 is connected to a reference element 21 by means of mounting devices 29A, 29B, 29C and 29D. The reference element 21 can be part of the dashboard 3 or steering wheel 6.

Touchscreen 16, in an advantageous embodiment, can include a force sensor (or equivalent sensor) (not shown), by means of which a force exerted by an operator on the touchscreen 16 can be determined. In this manner, touching of the touchscreen 16 by an operator can be distinguished from deliberate operation by pressing on touchscreen 16. In this case, pressing on touchscreen 16 at a site displayed as operating element therefore leads to operation of touchscreen 16, but simple touching of the touchscreen 16 by an operator at a site displayed as operating element does not. This embodiment is advantageous for use in vehicles.

Touchscreen 16 is secured by means of a frame 15. Frame 15 has four U-shaped springs 11, 12, 13, 14, which are connected to each other by connection elements 15A, 15B, 15C and 15D. The frame 15 is a cast plastic part, i.e., the U-shaped springs 11, 12, 13, 14 are cast, together with the connection elements 15A, 15B, 15C and 15D, from a piece of plastic. Such plastic can include polycarbonate, ABS, acetal or polyethylene. Particularly suitable U-shaped springs can be made from acetal.

The frame is glued to the connection elements 15A and 15C to touchscreen 16. In an alternative or additional embodiment, the touchscreen 16 is secured in the frame by biasing of the U-shaped springs 11, 12, 13, 14.

FIG. 3 shows a (flexible) connection piece 19, which is connected to connection element 15C. The connection piece 19 has a curvature 19A, which includes an eccentric driveshaft pin 18A of an actuator 18 designed as an electric motor. The rotational movement of actuator 18 is converted to translational movement. The actuator 18 is equipped as a DC (brush) motor. However, other embodiments, in conjunction with a different connection to frame 15, are also usable, for example, piezo actuators or so-called voice coils.

The U-shaped springs 11, 12, 13, 14 each have two spring arms 25 and 27, an opening 28 arranged between the two spring arms 25 and 27 and a connection point 26, at which the two spring arms 25 and 27 are connected. The U-shaped springs 11, 12, 13, 14 have a main spring constant essentially parallel to opening 28 and a secondary spring constant essentially perpendicular to opening 28, in which the secondary spring constant is at least four times the main spring constant. In the present practical example, the main spring constant refers to the direction denoted HR in FIG. 3 as main direction and the secondary spring constant refers to the direction denoted as secondary direction NR in FIG. 3. The main direction HR and the secondary direction NR are orthogonal to each other, but parallel to operating surface 16A.

The U-shaped springs 11, 12, 13, 14 have a thickness D from 0.5 mm to 2 mm, in the present practical example of 0.8 mm. The width of opening 28 is between 5 mm and 30 mm. The specific width of opening 28 is chosen as a function of the material, so that a desired main spring constant is achieved. The main spring constant is then adjusted to a weight of the touchscreen 16, so that the touchscreen 16, in conjunction with U-shaped springs 11, 12, 13, 14, has a mechanical natural frequency of 5 Hz to 150 Hz, especially a natural frequency from 30 Hz to 75 Hz. In the present practical example, it is prescribed that the natural frequency is 55 Hz. Natural frequency according to the invention is then especially the smallest mechanical resonance frequency of a system of U-shaped springs 11, 12, 13, 14 and touchscreen 16.

The term U-shaped springs according to the invention is supposed to be understood in broad terms. U-shaped springs according to the invention therefore are supposed to include springs that have two spring arms.

The touchscreen 16 and the display 17 according to FIGS. 3 and 4 are connected, in terms of data, to a control 20, from which a signal A is transmitted to display 17 with information to displayed on display 17. From the touchscreen 16, the control 20 receives a signal P, in which a user of touchscreen 16 is touching the touchscreen 16 and/or, if provided, whether the user is pressing on a position of touchscreen 16 marked as input position, so that this is to be understood as input. It can be prescribed that an input occurs by simple touching of touchscreen 16. However, it can also be prescribed that an input does not already occur by simple touching of touchscreen 16, but by (light) pressing on touchscreen 16. The latter is a procedure particularly suitable for use in vehicles.

It is prescribed that additional or other information can be displayed on display 17 during touching of the operating surface 16A and at least a second, simultaneously occurring touching of operating surface 16A. For this purpose, a procedure depicted in FIG. 5 in an advantageous embodiment is implemented in control 20. The procedure depicted in the advantageous embodiment of FIG. 5 begins with a query 30, whether the position of contact of the touch surface 16A has changed from a first position P1 with the coordinates x1 and y1 to a second position P2 with the coordinates x2 and y2 and back to the first position P1, within a time interval shorter than an upper time limit. The upper time limit, in an embodiment of the invention, is then less than or equal to 1 s, especially less than or equal to 0.5 s.

Figure 5:
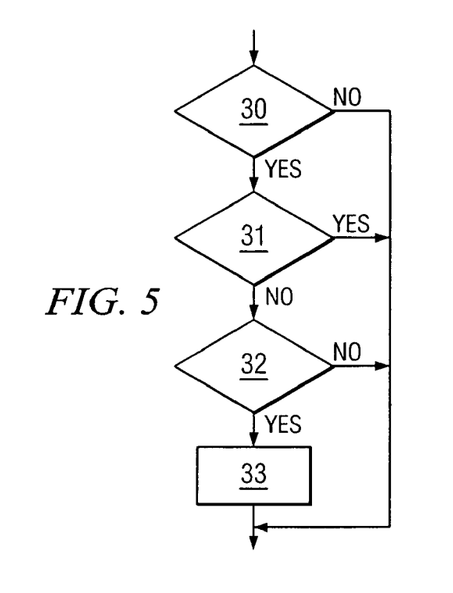
FIG. 5 shows a procedure implemented in a control.

If the position of contact of the operating surface 16A has changed within the stipulated time interval that is shorter than an upper time limit from a first position P1 to a second position P2 and back to the first position P1, query 30 is followed by a query 31, whether the aforementioned time interval is shorter than a lower time limit. The lower time limit in an embodiment of the invention is then less than or equal to 0.1 s.

If the aforementioned time interval is not shorter than a lower time limit, query 31 is optionally followed by a query 32, whether $$\Delta do \geq \sqrt{(x1-x2)^2 + (y1-y2)^2} \geq \Delta du$$

in which $\Delta do$ is a value between 50 mm and 20 mm and $\Delta du$ is a value between 10 mm and 2 mm. If $$\Delta do \geq \sqrt{(x1-x2)^2 + (y1-y2)^2} \geq \Delta du$$

query 32 is followed by a step 33, in which additional or other information is displayed.

The procedure depicted in an advantageous embodiment of FIG. 5 considers that the touchscreen 16 is configured, so that a second, simultaneously occurring touching of operating surface 16A is reflected in signal P as a change in position of touching of operating surface 16A. If touching of operating surface 16A occurs at a position with the coordinates x1 and y1, the touchscreen 16 delivers these coordinates as signal P. If a second additional touching of operating surface 16A occurs at a position with the coordinates x3 and y3, the touchscreen 16 delivers the coordinates x2 and y2 as signal P, in which:

$$(x_2 - x_1)^2 + (y_2 - y_1)^2 \approx (x_2 - x_3)^2 + (y_2 - y_3)^2$$

and $$(x_2 - x_1)^2 + (y_2 - y_1)^2 \approx \frac{(x1 - x_3)^2 + (y_1 - y_3)^2}{2}$$

In the procedure depicted in an advantageous embodiment in FIG. 5, with consideration of this implementation of touchscreen 16, the aforementioned additional or other information can only be displayed on display 16, if the first touching of operating surface 16A begins before the second touching of operating surface 16A and the second touching of operating surface 16A ends before the first touching of operating surface 16A. It can also be prescribed that corresponding touching of operating surface 16A, described with reference to FIG. 5, denotes pressing on operating surface 16A.

It can be prescribed to confirm the displays of additional other information by tactile means and/or to provide tactile feedback to confirm entry of a command. It can then be prescribed that the control 20 generates a control signal S, lasting at least 50 ms, as confirmation of the display of additional or other information and/or as confirmation of input of a command, by means of which the actuator 18 is briefly moved. The individual components of the input device are then dimensioned, so that the touchscreen 16 is deflected less than 1 mm. A control signal S, for example, can be a simple jump function for a duration between 50 ms and 800 ms, especially for a duration between 100 ms and 400 ms, or a control signal to generate a more complex movement.

In an embodiment preferred by a number of test subjects, the touchscreen 16 can be moved, for confirmation of the command entered by means of touchscreen 16, with a diminishing oscillation in a direction parallel to touchscreen 16. The diminishing vibration has an envelope curve with an exponential fraction. The envelope curve then has a term $t^{a0}$ or a term $b0^t$, in which a0 and b0 are variables. The envelope curve can be a function of $a1+a2 \cdot t^{a3}$ or $b1+b2^t$, in which a1, a2, a3, b1 and b2 are variables. In addition, the diminishing oscillation has a frequency between 5 Hz and 80 Hz. A particularly suitable control signal has a frequency of 38.1 Hz and is decayed after 210 ms, in which decay occurs according to a quadratic relation.

The input devices 4 and 8, configured according to input device 10, can be used in an advantageous embodiment of the display and operating device disclosed in WO 00/21795 (incorporated by reference), while retaining its menu-guided functionality. FIG. 6, FIG. 7, FIG. 8, FIG. 9, FIG. 10, FIG. 11, FIG. 12, FIG. 13, FIG. 14, FIG. 15, FIG. 16 and FIG. 17 show different masks that can be displayed by means of input device 10.

Figure 6:
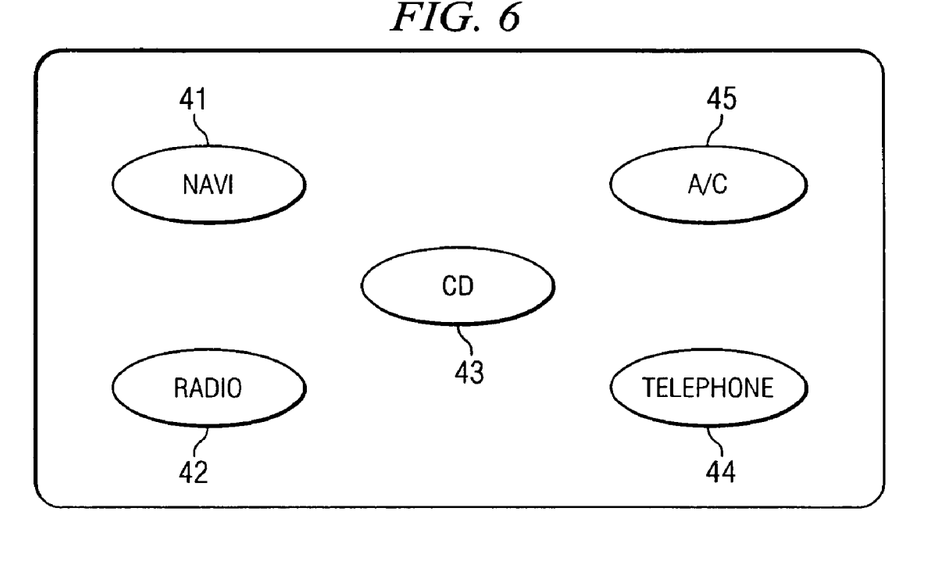
FIG. 6 shows a practical example for a base mask, displayed by means of an input device.
Figure 7:
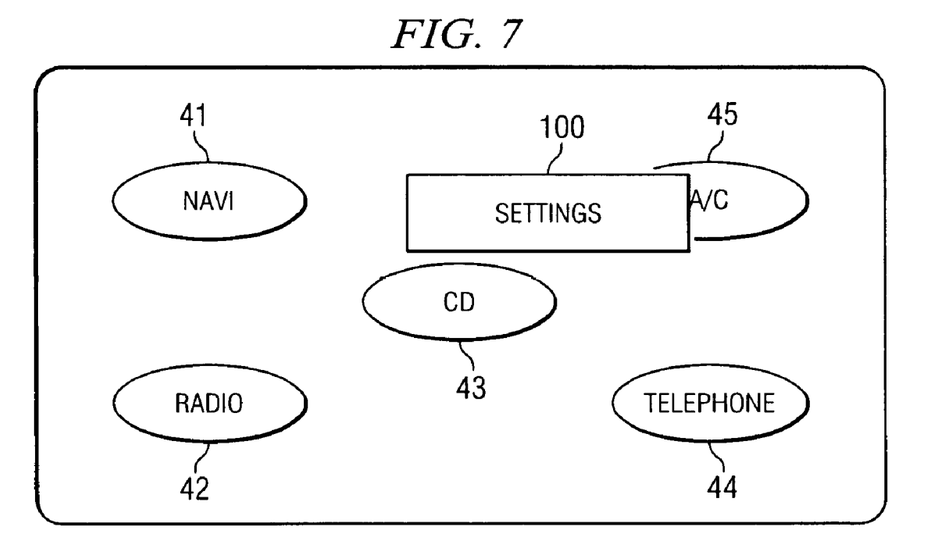
FIG. 7 shows the base mask depicted in FIG. 6 with an additional menu.

The input device 10 is shown in FIG. 6 with a base mask. The input device 10 then represents five operating elements 41, 42, 43, 44 and 45, made as ellipses. By pressing the operating element 42 in FIG. 6, a mask for operation of a radio is called up, and by pressing operating element 43 in FIG. 6, a mask for operation of a CD player is called up. If a first touching of operating surface 16A occurs outside of operating elements 41, 42, 43, 44 and 45 or a first pressing on the operating surface 16A occurs in a region of the operating surface 16A outside of operating elements 41, 42, 43, 44 and 45, and a second touching of operating surface 16A that satisfies the corresponding conditions of the procedure, described with reference to FIG. 5, or a second pressing on operating surface 16A that satisfies the corresponding conditions of the procedure, described with reference to FIG. 5, an additional menu 100, shown in FIG. 7, is displayed by means of display 17, which can be operated by touching the input "settings" or pressing on the input "settings". It can also be prescribed that the additional menu 100 is displayed when a first touching of the operating surface 16A and a second touching of operating surface 16A that satisfies the corresponding conditions of the procedure, described with reference to FIG. 5, occur.

Figure 8:
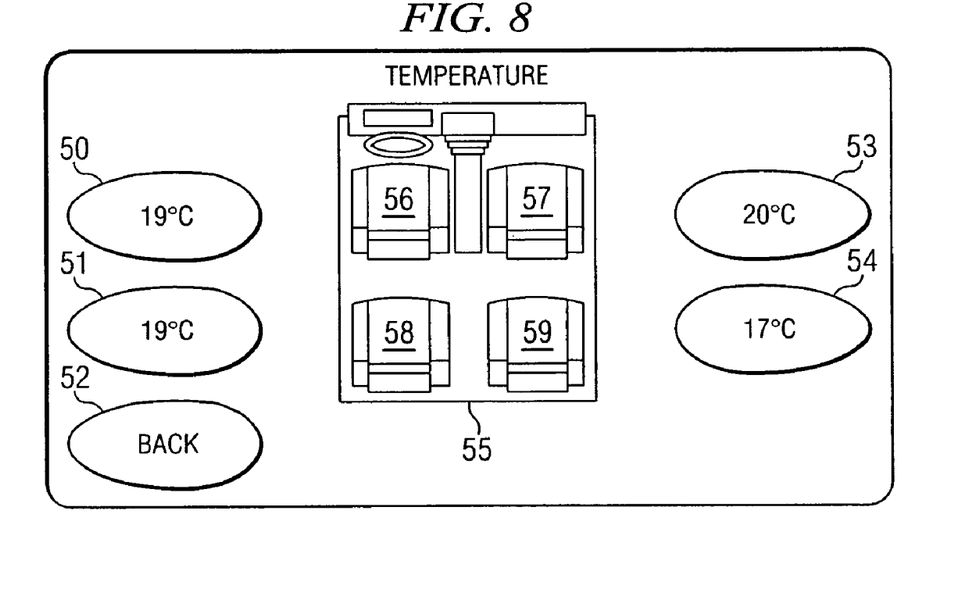
FIG. 8 shows a practical example for a mask for operation of an air conditioner.

By pressing the operating element 45 in FIG. 6 and FIG. 7, a mask, shown in FIG. 8, for operation of an air conditioner is called up. In the mask depicted in FIG. 8, temperature data of the individual locations in the vehicle interior, together with operating elements 50, 51, 52, 53 and 54, are shown, in which the temperature data, referred to actually adjusted temperatures that can be changed via the operating elements 50, 51, 53 and 54. Display according to FIG. 8 with the heading "TEMPERATURE" and display of an interior 55 of a vehicle makes it clear that the temperature in the vehicle interior can be adjusted individually and with reference to seat location. The operating element 50 shows, for the front driver seat 56, that the temperature 19° C. is set. The operating element 53 shows, for the front passenger seat 57, that a temperature of 20° C. is set. For the backseats 58 and 59, 19° C. is set on the left side and 17° C. on the right. The operating element 52 has an allocation, i.e., a function allocation, which is shown in the display field with "back" (to the next higher menu display, i.e., in the present case, to the mask according to FIG. 6).

Figure 9:
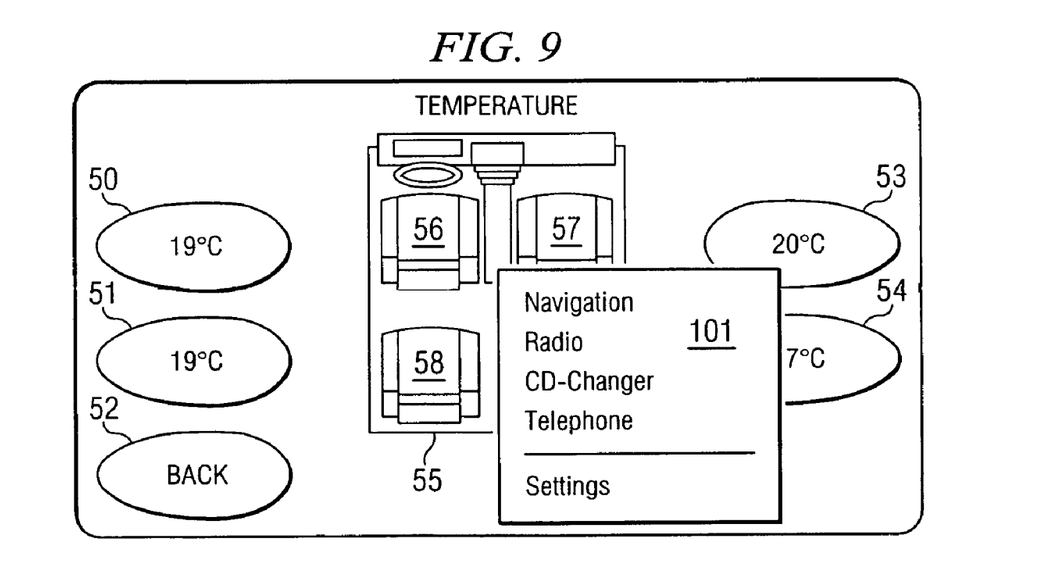
FIG. 9 shows the mask depicted in FIG. 8 with an additional menu.

If a first touching of operating surface 16A occurs outside of operating elements 50, 51, 53 and 54, and a first pressing on operating surface 16A occurs in a region of the operating surface 16A outside of operating elements 50, 51, 53 and 54, and a second touching of operating surface 16A that satisfies the corresponding conditions of the procedure, described with reference to FIG. 5, or a second pressing of operating surface 16A that satisfies the corresponding conditions of the procedure, described with reference to FIG. 5, occurs, an additional menu 101, depicted in FIG. 9, is displayed by means of display 17, which can be operated by touching the inputs "navigation", "radio", "CD changer", "telephone" or "settings", or pressing the inputs "navigation", "radio", "CD changer", "telephone" or "settings". It can also be prescribed that the additional menu 101 is displayed while first touching of the operating surface 16A and a second touching of operating surface 16A that satisfies the corresponding conditions of the procedure, described with reference to FIG. 5, occurs.

Figure 10:
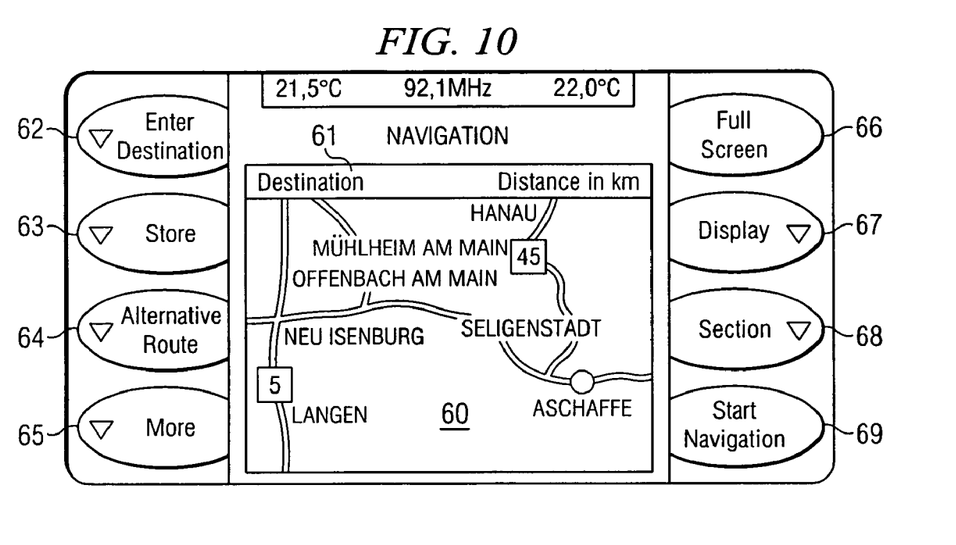
FIG. 10 shows a practical example for a mask for operation of a navigation system.

By pressing the operating element 41 in FIG. 6, a mask, depicted in FIG. 10, for operation of a navigation system is called up. The mask shows a section of a street map 60 of the instantaneous vehicle location and above the street map 60 in a field 61, the destination and distance to the destination. In addition, operating elements 62, 63, 64, 65, 67 and 68 are shown, by means of which submasks can be called up by pressing. An operating element 66 to display a full picture and an operating element 69 to start guiding are also displayed. With reference to the details of the entered menu, WO 00/21795 is referred to, in which the operating elements 62, 63, 64, 65, 66, 67, 68 and 69 replace the operating elements 3*a*, 3*b*, 3*c*, 3*d*, 3*e*, 3*f*, 3*g* and 3*h*, disclosed in WO 00/21795.

Figure 11:
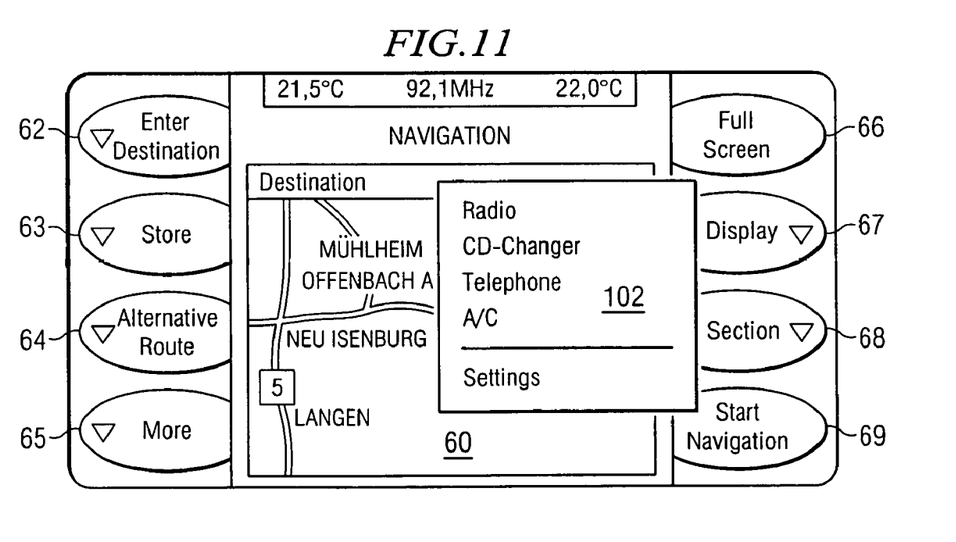
FIG. 11 shows the mask depicted in FIG. 10 with an additional menu.

If a first touching of operating surface 16A occurs outside of operating element 62, 63, 64, 65, 66, 67 68 and 69 or a first pressing on the operating surface 16A occurs in a region of the operating surface 16A outside of operating elements 62, 63, 64, 65, 66, 67, 68 and 69, and a second touching of operating surface 16A that satisfies the corresponding conditions of the procedure, described with reference to FIG. 5, or a second pressing of operating surface 16A that satisfies the corresponding conditions of the procedure, described with reference to FIG. 5, occurs, an additional menu 102, shown in FIG. 11, is displayed by means of display 17, which can be operated by touching the inputs "radio", "CD changer", "telephone", "air conditioner" or "settings", or by pressing the inputs "radio", "CD changer", "telephone", "air conditioner" or "settings". It can also be prescribed that the additional menu 102 is displayed when a first touching of operating surface 16A and a second touching of operating surface 16A that satisfies the corresponding conditions of the procedure, described with reference to FIG. 5, occur.

Figure 12:
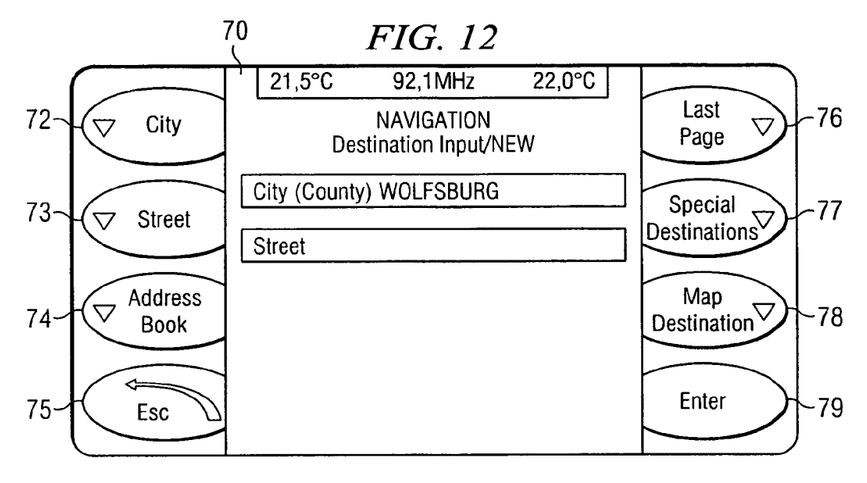
FIG. 12 shows a practical example for a lower mask for operation of a navigation system.

By pressing the operating element 62 in FIG. 10 and FIG. 11, a submask according to FIG. 12 is called up, which displays the travel destination in a field 70. By means of the submask according to FIG. 12, operating elements 72, 73, 74, 75, 76, 77, 78 and 79 are also displayed. With reference to details of the entered menu, WO 00/21795 is also referred to, in which the operating elements 72, 73, 74, 75, 76, 77, 78 and 79, shown on the display, replace the operating elements 3*a*, 3*b*, 3*c*, 3*d*, 3*e*, 3*f*, 3*g* and 3*h*, disclosed in WO 00/21795.

Figure 13:
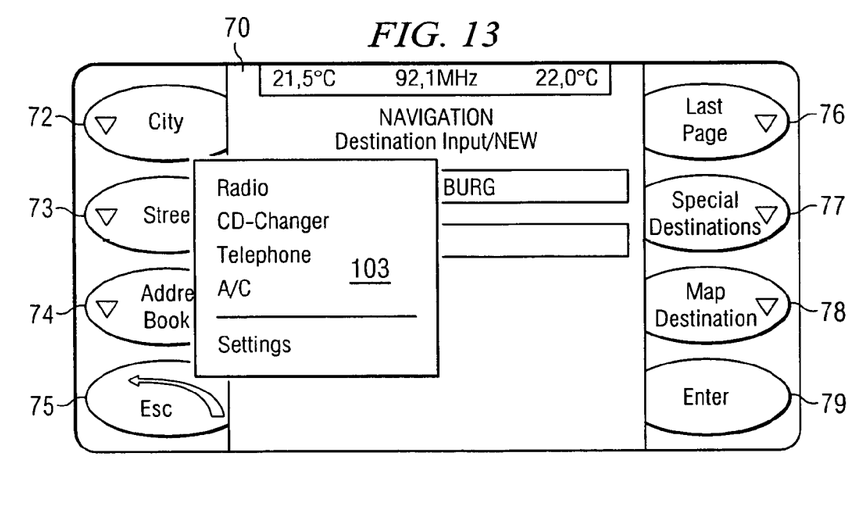
FIG. 13 shows the lower mask depicted in FIG. 12 with an additional menu.

If a first touching of operating surface 16A occurs outside of operating elements 72, 73, 74, 75, 76, 77, 78 and 79 or a first pressing on the operating surface 16A occurs in a region of the operating surface 16A outside of operating elements 72, 73, 74, 75, 76, 77, 78 and 79, and a second touching of operating surface 16A that satisfies the corresponding conditions of the procedure, described with reference to FIG. 5, or a second pressing on operating surface 16A that satisfies the corresponding conditions of the procedure, described with reference to FIG. 5, occurs, an additional menu 103, depicted in FIG. 13, is displayed by means of display 17, which can be operated by touching the inputs "radio", "CD changer", "telephone", "air conditioner" or "settings" or by pressing the inputs "radio", "CD changer", "telephone", "air conditioner" or "settings". It can also be prescribed that the additional menu 103 is displayed when a first touching of operating surface 16A and a second touching of operating surface 16A that satisfies the corresponding conditions of the procedure, described with reference to FIG. 5, occur.

Figure 14:
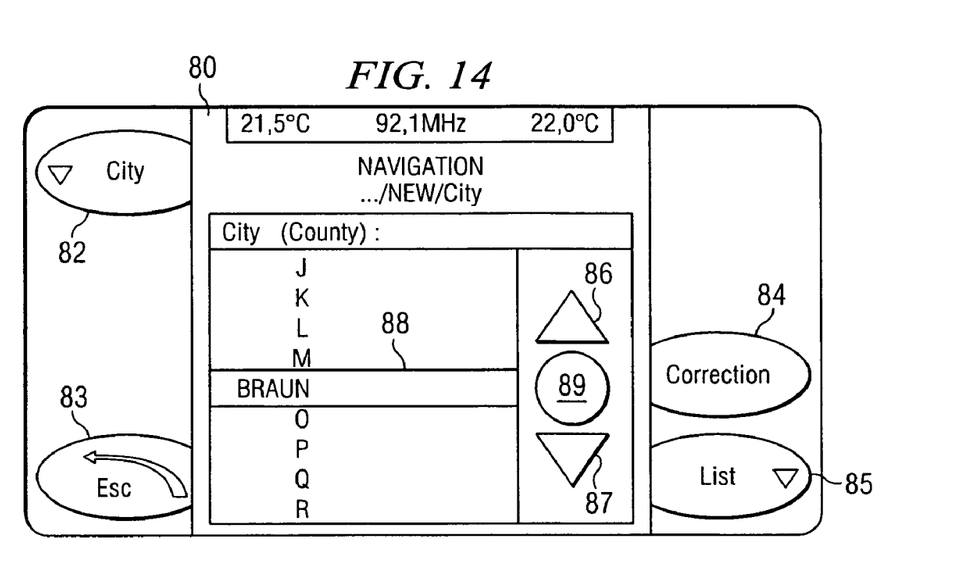
FIG. 14 shows a practical example for an additional lower mask for operation of a navigation system.

By pressing the operating element 72 in FIG. 12 or FIG. 13, a submask according to FIG. 14 is called up, which displays a destination to be entered in a field 80. By means of the submask according to FIG. 14, operating elements 82, 83, 84 and 85 are also displayed, which replace the operating elements 3*a*, 3*d*, 3*g* and 3*h*, disclosed in WO 00/21795. A letter selection line 88, as well as operating elements 86, 89 and 89, are shown in field 80. The letter selection line 88 can be moved upward or downward by pressing the operating elements 86 or 87. By pressing the operating element 89, a marked letter can be selected.

Figure 15:
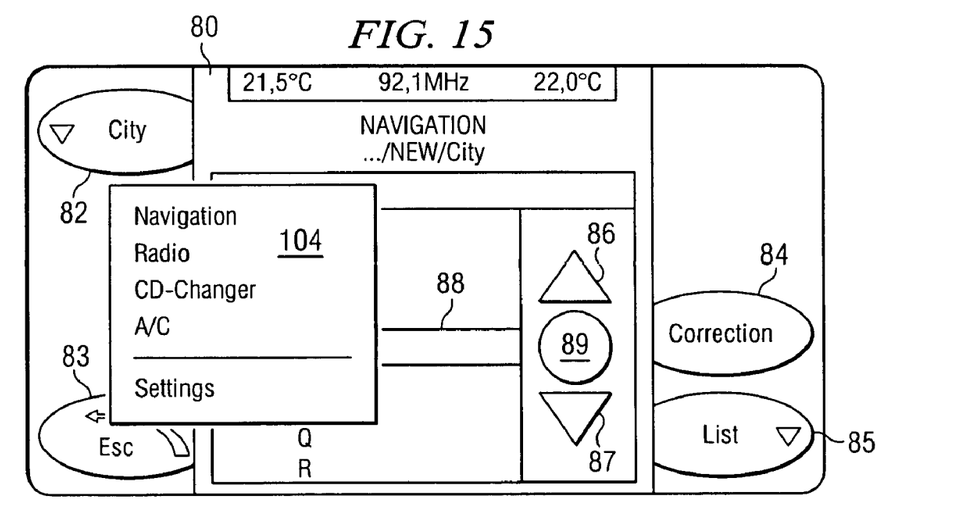
FIG. 15 shows the lower mask depicted in FIG. 14 with an additional menu.

If a first touching of operating surface 16A outside of operating elements 82, 83, 84, 85, 87 and 89 occurs or a first pressing on operating surface 16A in a region of the operating surface 16A outside of operating elements 82, 83, 84, 85, 87 and 89, and a second touching of operating 16A that satisfies the corresponding conditions of the procedure, described with reference to FIG. 5, or a second pressing on operating surface 16A that satisfies the corresponding conditions of the procedure, described with reference to FIG. 5, occurs, an additional menu 104, shown in FIG. 15, is displayed by means of display 17, which can be operated by touching the inputs "radio", "CD changer", "telephone", "air conditioner" or "settings" or by pressing the inputs "radio", "CD changer", "telephone", "air conditioner" or "settings". It can also be prescribed that the additional menu 104 is displayed when a first touching of the operating surface 16A and a second touching of the operating surface 16A that satisfies the corresponding conditions of the procedure, described with reference to FIG. 5, occur.

Figure 16:
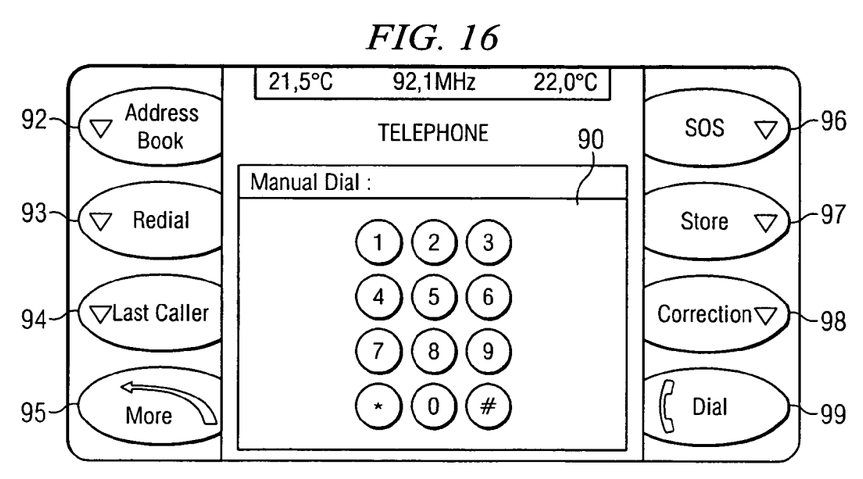
FIG. 16 shows a practical example for a mask for operation of a telephone.

By pressing the operating element 44 in FIG. 6 and FIG. 7, a mask, depicted in FIG. 16, for operation of a telephone is called up, which displays selection keys for a telephone in a field 90. By means of the submask according to FIG. 16, operating elements 92, 93, 94, 95, 96, 97, 98 and 99 are also displayed, which replace the operating elements 3*a*, 3*b*, 3*c*, 3*d*, 3*e*, 3*f*, 3*g* and 3*h*, disclosed in WO 00/21795. The selection keys for a telephone, shown in field 90, are equipped as operating elements, by means of which a telephone number can be dialed.

Figure 17:
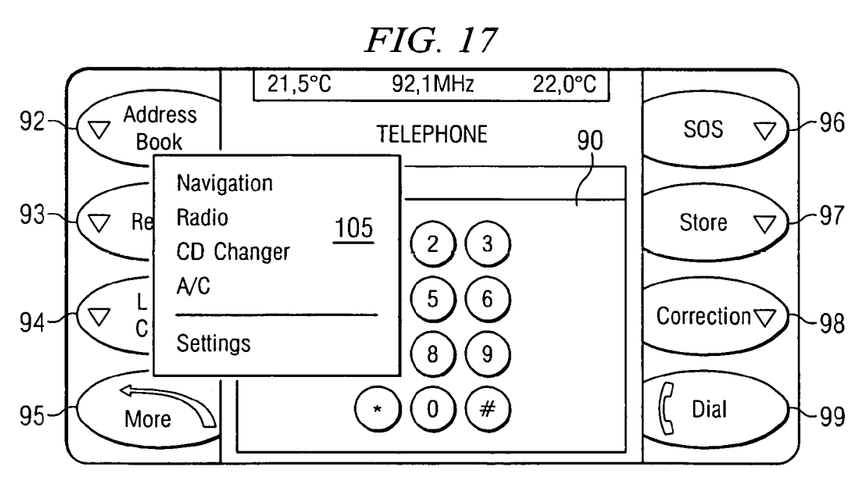
FIG. 17 shows the mask depicted in FIG. 16 with an additional menu.

If a first touching of operating surface 16A occurs outside of operating elements 92, 93, 94, 95, 96, 97, 98 and 99 or a first pressing on the operating surface 16A occurs in a region of the operating surface 16A outside of the operating elements 92, 93, 94, 95, 96, 97, 98 and 99, and a second touching of operating surface 16A that satisfies the corresponding conditions or the procedure, described with reference to FIG. 5, or a second pressing on operating surface 16A that satisfies the corresponding conditions of the procedure, described with reference to FIG. 5, occurs, additional menu 105, depicted in FIG. 17 is displayed by means of display 17, which can be operated by touching the inputs "navigation", "radio", "CD changer", "air conditioner" or "settings", or by pressing on the inputs "navigation", "radio", "CD changer", "air conditioner" or "settings". It can also be prescribed that the additional menu 105 is displayed in a first touching of operating surface 16A and a second touching of operating surface 16A that satisfies the corresponding conditions of the procedure, described with reference to FIG. 5, occur.

It can be prescribed that during successful operation of operating elements 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98 and 99 or inputs "navigation", "radio", "CD changer", "telephone", "air conditioning" and "settings", a tactile feedback is produced. For this purpose, the touchscreen of the input device 10 can be moved accordingly when a user input occurs by pressing on the corresponding operating element 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98 and 99 or by touching or pressing the inputs "navigation", "radio", "CD changer", "telephone", "air conditioning" and "settings". As an alternative, a corresponding tactile feedback can also occur during successful call-up of an additional menu. This is particularly advantageous for use in a vehicle, since an operator, for example, the driver of the vehicle, in this way obtains a confirmation of his input without having to look at the display. In this way, safety during driving is increased.

The invention is particularly suitable for use in a vehicle, but is not restricted to this use. The vehicle according to the invention is especially an individual land vehicle, usable in street traffic. Vehicles according to the invention are not particularly restricted to land vehicles with an internal combustion engine.

Although described in conjunction with a touchscreen with tactile feedback, the invention can also be used in conjunction with a touchscreen without tactile feedback.

The inputs "navigation", "radio", "CD changer", "telephone", "air conditioner" and "settings" are practical examples for additional or other information according to the invention.

LIST OF REFERENCE NUMBERS

| | |
|---|---|
| 1, 5 | Cockpit |
| 2, 6 | Steering wheel |
| 3, 7 | Dashboard |
| 4, 8, 10 | Input device |
| 11, 12, 13, 14 | Spring |
| 15 | Frame |
| 15A, 15B, 15C, 15D | Connection element |
| 16 | Touchscreen |
| 16A | Operating surface |
| 17 | Display |
| 18 | Actuator |
| 18A | Driveshaft pin |
| 19 | Connection piece |
| 19A | Curvature |
| 20 | Control |
| 21 | Reference element |
| 25, 27 | Spring arm |
| 26 | Connection point |
| 28 | Opening |
| 29A, 29B, 29C, 29D | Mounting device |

-continued

LIST OF REFERENCE NUMBERS

| | |
|---|---|
| 30, 31, 32 | Query |
| 33 | Step |
| 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99 | Operating elements |
| 55 | Interior space |
| 56 | Driver seat |
| 57 | Passenger seat |
| 58, 59 | Backseat |
| 60 | Street map |
| 61, 70, 80, 90 | Field |
| 88 | Letter selection line |
| 100, 101, 102, 103, 104 | Additional menu |
| A, P | Signal |
| D | Thickness |
| HR | Main direction |
| NR | Secondary direction |
| S | Control signal |

What is claimed is:

1. An input device comprising:
a display for optical display of information;
a touchscreen arranged above the display for entry of commands by touching an operating surface of the touchscreen; and
a control for optical display of information on the display, wherein the control is configured to detect a first touching and at least a second touching of the operating surface, wherein the second touching starts after a start of the first touching and ends before an end of the first touching;
wherein the control is further operable to display a first graphical mask comprising areas each comprising a graphical representation of an operating element and wherein an additional graphical menu is displayed by the control on the display only when a second touching is detected such that the additional graphical menu is displayed by the control on the display in response to the second touching ending before the end of the first touching.

2. An input device according to claim 1, wherein the control only displays the additional graphical menu if the first touching lies outside any areas which comprise graphical representations of operating elements.

3. An input device according to claim 1, wherein said additional graphical menu is displayed on the display by the control only when the second touching of the operating surface lasts shorter than an upper time limit.

4. An input device according to claim 3, wherein the upper time limit is less than or equal to 1 s.

5. An input device according to claim 4, wherein the upper time limit is less than or equal to 0.5 s.

6. An input device according to claim 1, further comprising:
an actuator for movement of the touchscreen.

7. An input device according to claim 6, wherein the actuator can be controlled by a control, so that the touchscreen is moved for confirmation of entering a command.

8. A method of operating an input device comprising the steps of:

displaying a graphical mask comprising areas each comprising a graphical representations of an operating element on a touchscreen display for optical display of information and for entry of information;

entering a command by detecting a first touching of an operating surface of the touchscreen display and by further detecting a second touching of the operating surface, wherein the second touching starts after a start of the first touching and ends before an end of the first touching; and only upon detection of the second touching, displaying an additional graphical menu on the touchscreen display, such that the additional graphical menu is displayed on the touchscreen display in response to the second touching ending before the end of the first touching.

9. A method according to claim 8, further comprising only displaying the additional graphical menu if the first touching lies outside any areas which comprise graphical representations of operating elements.

10. A method according to claim 8, wherein said additional graphical menu is displayed on the display only when the second touching of the operating surface lasts shorter than an upper time limit.

11. A method according to claim 10, wherein the upper time limit is less than or equal to 1 s.

12. A method according to claim 11, wherein the upper time limit is less than or equal to 0.5 s.

13. A method according to claim 1, further comprising the step of controlling an actuator for moving of the touchscreen such that the touchscreen is moved for confirmation of entering the command.

14. An input device comprising:
a display for optical display of information;
a touchscreen arranged above the display for entry of commands by touching an operating surface of the touchscreen;
a control for optical display of information on the display, wherein the control is configured to detect a first touching and at least a second touching of the operating surface, wherein the second touching starts after a start of the first touching and ends before an end of the first touching, wherein the control is further operable to display a first graphical mask comprising areas each comprising a graphical representation of an operating element and displays an additional graphical menu on the display when the second touching is detected, such that the additional graphical menu is displayed by the control on the display in response to the second touching ending before the end of the first touching; and
an actuator for movement of the touchscreen.

15. An input device according to claim 14, further comprising a control for controlling the actuator which is operable to move the touchscreen for confirmation of entering a command.

16. An input device comprising:
a display for optical display of information;
a touchscreen arranged above the display for entry of commands by touching an operating surface of the touchscreen; and
a control for optical display of a submenu on the display in response to a first touching of the operating surface outside a displayed operating element and a second touching of the operating surface, wherein the second touching starts after a start of the first touching and ends before an end of the first touching, such that control displays the submenu on the display in response to the second touching ending before the end of the first touching.

17. An input device according to claim 16, wherein said additional graphical menu is displayed on the display by the control only when the second touching of the operating surface lasts shorter than an upper time limit.

18. An input device according to claim 17, wherein the upper time limit is less than or equal to 1 second.

19. An input device according to claim 16, wherein the upper time limit is less than or equal to 0.5 seconds.

20. An input device according to claim 16, further comprising an actuator for movement of the touchscreen.

21. An input device according to claim 20, wherein the actuator can be controlled by a control, so that the touchscreen is moved for confirmation of entering a command.

* * * * *